(12) United States Patent  
Bethea et al.

(10) Patent No.: US 8,493,580 B2  
(45) Date of Patent: *Jul. 23, 2013

(54) GENERATION OF EXECUTABLES FOR A HETEROGENEOUS MIX OF MULTIFUNCTION PRINTERS

(75) Inventors: Timothy J Bethea, Sunnyvale, CA (US); Neil H Boyette, Oregon City, OR (US); Isaac K Cheng, San Jose, CA (US); Vikas Krishna, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/594,272

(22) Filed: Aug. 24, 2012

(65) Prior Publication Data

US 2012/0320400 A1    Dec. 20, 2012

Related U.S. Application Data

(63) Continuation of application No. 12/485,583, filed on Jun. 16, 2009.

(51) Int. Cl.
*G06K 15/00* (2006.01)
*G06F 3/12* (2006.01)
*G06F 15/00* (2006.01)

(52) U.S. Cl.
USPC .............. 358/1.13; 358/1.2; 358/2.1; 358/1.9

(58) Field of Classification Search
USPC ............................. 358/1.9, 2.1, 1.13, 401, 1.2
See application file for complete search history.

(56) References Cited

U.S. PATENT DOCUMENTS

| | | | |
|---|---|---|---|
| 5,559,933 A | | 9/1996 | Boswell |
| 5,867,636 A | | 2/1999 | Walker |
| 6,246,486 B1 * | | 6/2001 | Takahashi ................... 358/1.13 |
| 6,633,405 B1 | | 10/2003 | Nguyen |

(Continued)

FOREIGN PATENT DOCUMENTS

| | | | |
|---|---|---|---|
| JP | 2003250045 | * | 9/2003 |
| JP | 2010105311 | * | 5/2010 |

OTHER PUBLICATIONS

μd Micro Digital, "GUI Embedded Graphical User Interface ARM", available at http://www.smxrtos.com/gui.htm, 4 pages, last visited Jun. 16, 2009, or Dec. 2003.

(Continued)

*Primary Examiner* — Jerome Grant, II
(74) *Attorney, Agent, or Firm* — Jeffrey T. Holman (57) ABSTRACT

A computer-implemented method that includes incorporating an entity specification into a business process in response to an input by a user is described. The entity specification describes an element of a document and is associated with the business process. The computer-implemented method also includes determining a multifunction printer (MFP) from a heterogeneous mix of MFPs for implementation of the business process. The MFP has an associated executable language and a graphical user interface (GUI) specification. The computer-implemented method also includes associating the entity specification with an element of the GUI specification. The computer-implemented method also includes generating, from the entity specification and the business process, an executable that conforms to the executable language and the GUI specification and performs the business process when executed by the MFP. The computer-implemented method also includes deploying the executable to the MFP.

7 Claims, 5 Drawing Sheets

U.S. PATENT DOCUMENTS

| | | |
|---|---|---|
| 6,788,428 B1 | 9/2004 | Shimokawa |
| 7,095,523 B2 | 8/2006 | Brossman et al. |
| 7,219,168 B2 | 5/2007 | Koss |
| 7,246,348 B1 | 7/2007 | Mixer, Jr. |
| 7,256,901 B2 | 8/2007 | Ferlitsch |
| 7,312,886 B2 | 12/2007 | Gomi |
| 2002/0149786 A1* | 10/2002 | Hudson et al. ............. 358/1.9 |
| 2003/0105643 A1 | 6/2003 | Chen et al. |
| 2003/0197887 A1 | 10/2003 | Shenoy et al. |
| 2004/0080767 A1 | 4/2004 | Meilstrup et al. |
| 2004/0133542 A1 | 7/2004 | Doerksen et al. |
| 2006/0031238 A1 | 2/2006 | Baba |
| 2006/0031816 A1 | 2/2006 | Umeda |
| 2006/0179054 A1 | 8/2006 | Levi |
| 2007/0076254 A1 | 4/2007 | Reilly |
| 2009/0201554 A1* | 8/2009 | Tokumoto ............. 358/1.16 |
| 2009/0303535 A1* | 12/2009 | Ogura et al. ............. 358/1.15 |
| 2010/0265544 A1* | 10/2010 | Anezaki et al. ............. 358/1.15 |
| 2010/0318960 A1 | 12/2010 | Bethea et al. |
| 2011/0026042 A1* | 2/2011 | Cogan et al. ............. 358/1.2 |
| 2012/0188580 A1* | 7/2012 | Gaertner et al. ............. 358/1.14 |

OTHER PUBLICATIONS

Non-Final Office Action for U.S. Appl. No. 12/485,582, mailed Nov. 21, 2012, 20 pages.

\* cited by examiner

GENERATION OF EXECUTABLES FOR A HETEROGENEOUS MIX OF MULTIFUNCTION PRINTERS

CROSS-REFERENCE TO RELATED APPLICATIONS

This application is a continuation of U.S. application Ser. No. 12/485,583, filed on Jun. 16, 2009, which is incorporated by reference herein in its entirety.

BACKGROUND

Multifunction printers (MFPs) are being used for more and more functions in the modern business world. Businesses and individuals use MFPs to print, scan, fax, and copy documents. Often, more advanced business processes may be operated on an MFP. For example, a business process may dictate that a scanned document be directed to a specific destination in response to an input at the MFP.

A business process may be implemented in the form of an executable that operates on the MFP. Typically, the executable must be tailored for the particular brand and/or model of the MFP, since different MFPs use different executable languages and have different user interfaces. Consequently, an executable that implements a business process must be executed by the particular MFP for which it was written.

Many businesses, however, have a pool of heterogeneous MFPs using different executable languages and/or different user interfaces. Often, the MFPs are distributed in various locations around the business. As a result, a user must go to a particular MFP to perform a business process with an executable that operates on a particular MFP. The particular MFP associated with the executable may not be the ideal MFP for the user, based on location, properties of the MFP, or other factors.

SUMMARY

Embodiments of a computer-implemented method are described. In one embodiment, the computer-implemented method is a method for generating an executable to perform a business process on an MFP. The method includes incorporating an entity specification into a business process in response to an input by a user, determining an MFP from a heterogeneous mix of MFPs for implementation of the business process, and associating the entity specification with an element of the GUI specification. The method also includes generating an executable that performs the business process when executed by the MFP and deploying the executable to the MFP. The entity specification describes an element of a document and is associated with the business process. The MFP has an associated executable language and a GUI specification. The executable is generated from the entity specification and the business process, and conforms to the executable language and the GUI specification. Other embodiments of the computer-implemented method are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

In the following description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

In order to implement a business process on a plurality of dissimilar MFPs, the business process is stored in a platform-agnostic form. One or more entity specifications describe one or more elements of a document used in the business process. The entity specification(s) are associated with the business process. A particular MFP is selected for deployment of the business process, and parameters associated with the MFP, such as an executable language definition, are retrieved. An executable that performs the business process and conforms to the MFP parameters is generated for deployment to the MFP. The MFP may then use the executable to perform the business process, regardless of which MFP is selected.

Figure 1:
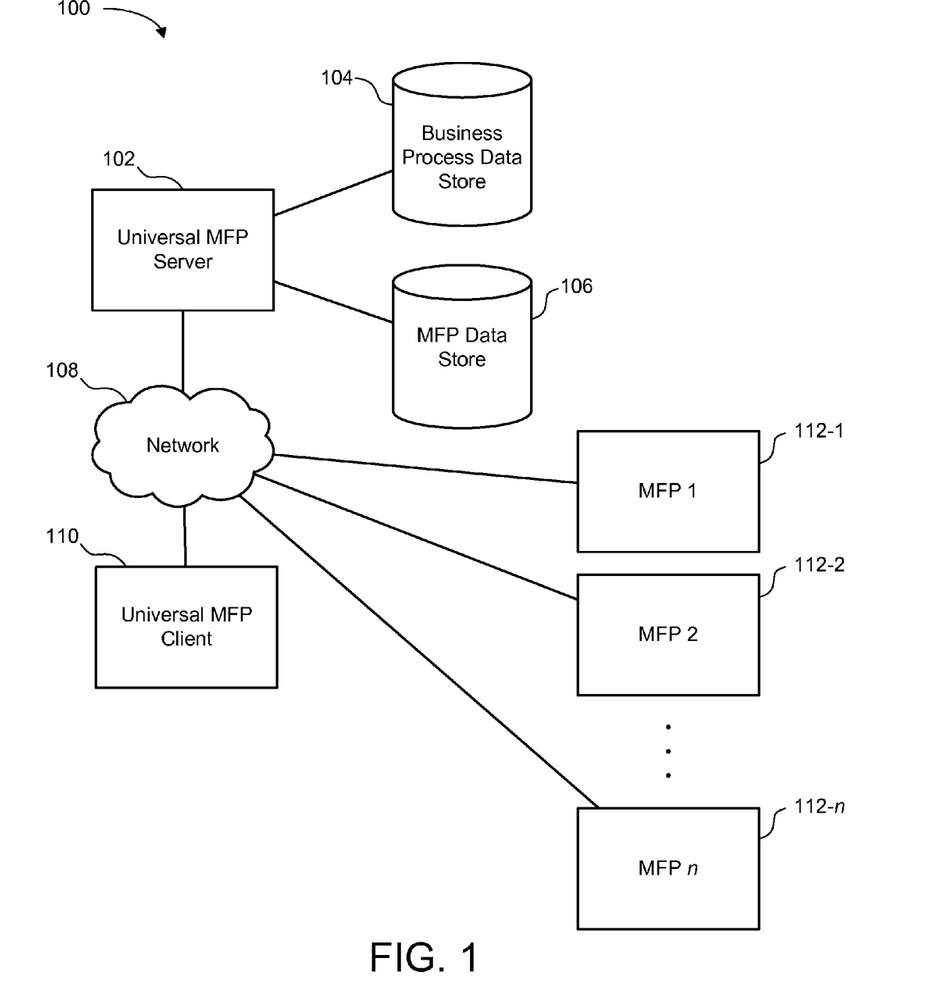
FIG. 1 depicts a schematic diagram of one embodiment of a system for generating an executable for an MFP of a heterogeneous mix of MFPs.

FIG. 1 depicts a schematic diagram of one embodiment of a system 100 for generating an executable for an MFP of a heterogeneous mix of MFPs 112. The system 100 includes a universal MFP server 102, a business process data store 104, an MFP data store 106, a universal MFP client, and a plurality of MFPs 112-1, 112-2, 112-n, collectively referred to as MFPs 112. The system 100 generates an executable to perform a business process on an MFP.

The universal MFP server 102, in one embodiment, generates the executable based on inputs from other elements of the system 100. The executable generated by the universal MFP server 102 is tailored to operate on a particular type of MFP from among the plurality of MFPs 112 and to execute a particular business process.

In some embodiments, the universal MFP server 102 is capable of generating an executable to perform the business process on any type of MFP from among the plurality of MFPs 112. For example, the universal MFP server 102 may have access to parameters that describe the capabilities and requirements of the MFPs in the plurality of MFPs 112. The universal MFP server 102 in this example may receive an input selecting a particular type of MFP from among the plurality of MFPs 112 and may convert a generic business process definition to an executable for the particular type MFP using the parameters relating to that type of MFP.

In certain embodiments, the universal MFP server 102 accesses a generic business process from the business process data store 104. The generic business process describes a workflow to be used for a document at an MFP 112. The universal MFP server 102 converts the generic business process into an executable that can operate on a particular MFP.

For example, the universal MFP server 102 may compile the generic business process into an executable that complies with an executable language definition for MFP 1 112-1.

The business process data store 104 may be any type of data storage capable of storing generic business process descriptions. For example, the business process data store 104 may be a form of nonvolatile memory such as a hard drive, flash memory, an optical disc, or another form of nonvolatile memory. In another example, the business process data store 104 may be a form of volatile memory such as RAM, cache memory, or another form of volatile memory. In some embodiments, the business process data store 104 is incorporated within the universal MFP server 102. For example, the business process data store 104 may be a hard drive in a computer that operates the universal MFP server 102. The business process data store 104 is connected directly to the universal MFP server 102 in one embodiment. In an alternative embodiment, the business process data store 104 is connected to the universal MFP server 102 over an intermediate medium, such as a network or a data bus.

The universal MFP server 102, in one embodiment, determines a particular type of MFP from among the plurality of MFPs 112 and receives parameters relating to the particular MFP. For example, the universal MFP server 102 may select MFP 1 112-1 and receive an identifier that identifies the type of MFP 1 112-1, such as a brand and model number. In another example, the universal MFP server 102 may receive an executable language definition as a parameter that describes an executable language that operates on the particular MFP.

In one embodiment, the universal MFP server 102 receives a parameter relating to the selected MFP from the MFP data store 106. For example, the universal MFP server 102 may determine that an executable should be generated for the type of MFP embodied by MFP 2 112-2. In this example, the universal MFP server 102 may retrieve an executable language definition that corresponds with MFP 2 112-2 from the MFP data store 106.

In another embodiment, the universal MFP server 102 receives a parameter relating to the selected MFP directly from the particular MFP. For example, MFP 1 112-1 may transmit a parameter, such as an identifier, to the universal MFP server 102.

The MFP data store 106 maybe any type of data storage capable of storing parameters relating to MFPs 112. For example, the MFP data store 106 maybe nonvolatile memory or volatile memory. The MFP data store 106 is in communication with the universal MFP server 102, and may be incorporated with the universal MFP server 102, directly connected to the universal MFP server 102, and/or connected to the universal MFP server 102 over an intermediate medium such as a network or data bus.

The network 108, in one embodiment, provides a medium for communication between elements of the system 100. The network 108 may be any type of network, including, but not limited to, a local network, a wide area network, or the Internet. In some embodiments, the network 108 is a composite of more than one type of network. For example, the network 108 may include a local network and the Internet.

The universal MFP client 110, in one embodiment, provides a user interface to submit inputs to the universal MFP server 102. The universal MFP client 110 receives input from a user. The user input may include a selection of a particular MFP from among the plurality of MFPs 112 for implementation of a particular business process.

In one embodiment, the universal MFP client 110 operates on a computer. For example, the universal MFP client 110 may be an application on a computer that allows a user to control various aspects of the universal MFP server 102. In an alternative embodiment, the universal MFP client 110 may operate on an MFP. For example, MFP 2 112-2 may include a user interface that receives inputs from a user that are submitted as parameters to the universal MFP server 102. In some embodiments, the universal MFP client 110 operates on the same computer as the universal MFP server 102.

In certain embodiments, the universal MFP client 110 receives inputs that describe the generic business process. For example, the universal MFP client 110 may receive an entity specification that describes an element of a document for use in the business process. The universal MFP client 110 may also receive information that describes a relationship between the entity specification and the business process.

The plurality of MFPs 112, in one embodiment, includes a heterogeneous mix of two or more types of MFPs. For example, the plurality of MFPs 112 may include MFPs from two or more manufacturers, MFPs that have different executable language definitions, and/or MFPs that have different graphical user interfaces. Traditionally, this heterogeneous mix of types of MFPs would present difficulty in maintaining business processes that operate on the various types of MFPs. The universal MFP server 102, however, accesses a generic business process description and is capable of generating executables to execute the business process on the various types of MFPs in the plurality of MFPs 112.

Figure 2:
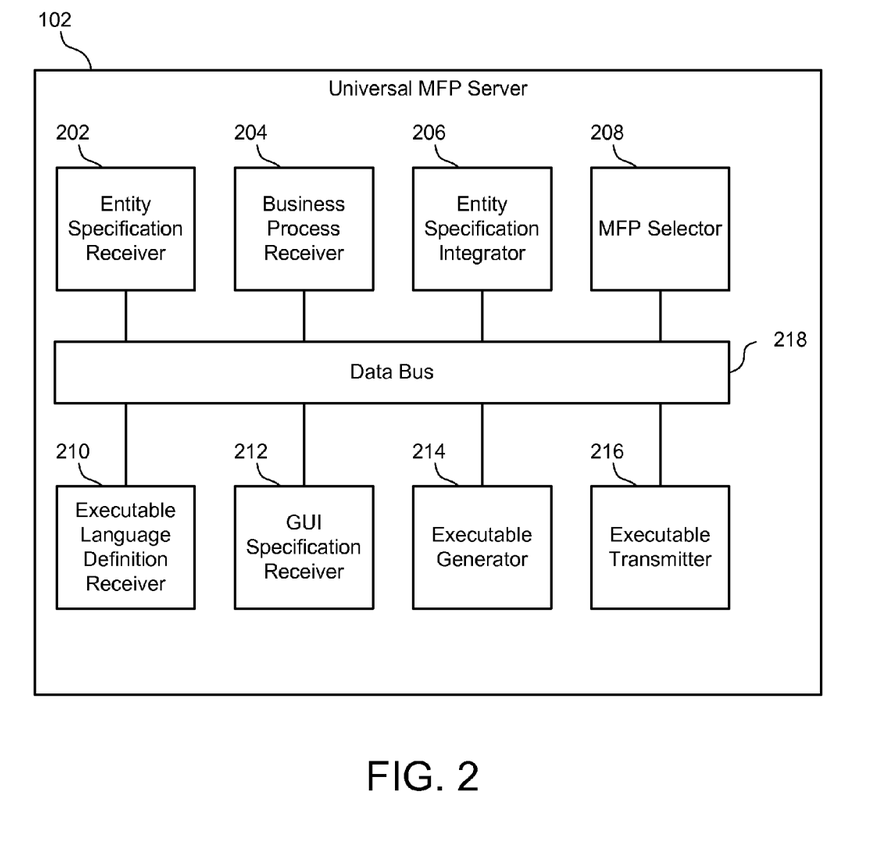
FIG. 2 depicts a schematic diagram of one embodiment of the universal MFP server of FIG. 1.

FIG. 2 depicts a schematic diagram of one embodiment of the universal MFP server 102 of FIG. 1. The universal MFPs server 102 includes an entity specification receiver 202, a business process receiver 204, an entity specification integrator 206, an MFP selector 208, an executable language definition receiver 210, a graphical user interface (GUI) specification receiver 212, an executable generator 214, an executable transmitter 216, and a data bus 218. The universal MFP server 102 converts a generic business process into an executable for use on a particular MFP.

The entity specification receiver 202, in one embodiment, receives an entity specification that describes an element of a document used in a business process. For example, the entity specification may describe a purchase date field of a scanned sales order by defining a regular expression and a general location of the document to search for the regular expression. In some embodiments, the entity specification receiver 202 receives an input from a user to define the entity specification. In an alternative embodiment, the entity specification receiver 202 receives input from a heuristic (not shown) to define the entity specification.

In one embodiment, the business process receiver 204 receives a generic business process definition. The generic business process definition describes a business process to be performed on an MFP. The business process receiver 204 receives the generic business process from the business process data store 104. In an alternative embodiment, the business process receiver 204 receives the generic business process from a user via the universal MFP client 110.

The entity specification integrator 206, in one embodiment, incorporates the entity specification into the generic business process. The entity specification integrator 206 receives input from a user describing how the entity specification is integrated into the generic business process. For example, the user may indicate that an entity specification describing a purchase date should be used in the business process to calculate a shipping date. In an alternative embodiment, the entity specification integrator 206 automatically incorporates the entity specification into the generic business process, such as through the use of a heuristic.

In one embodiment, the MFP selector 208 selects a particular type of MFP from among the plurality of MFPs 112. The MFP selector 208 selects a particular type of MFP in response to an input from a user. For example, a user may indicate a desire to execute the business process on a particular MFP which has a particular set of parameters.

In an alternative embodiment, the MFP selector 208 selects a particular type of MFP automatically. For example, the MFP selector 208 may determine the nearest MFP to a user who wishes to execute a business process and select the type of MFP corresponding to the nearest MFP. In another example, the MFP selector 208 may select multiple types of MFP and generate executables for those types of MFP in anticipation of the future need to implement the business process on those types of MFP.

The executable language definition receiver 210, in one embodiment, receives an executable language definition for the selected MFP type. The executable language definition describes the executable language of the selected MFP type. The executable language definition receiver 210 receives the executable language definition from the MFP data store 106. In an alternative embodiment, the executable language definition receiver 210 receives the executable language definition directly from an MFP of the selected type of MFP.

In one embodiment, the GUI specification receiver 212 receives a GUI specification for the selected MFP type. The GUI specification describes the user interface of the selected MFP type. For example, the GUI specification may describe the type of display on the selected MFP type and the number and position of buttons on the selected MFP type. The GUI specification receiver 212 receives the GUI specification from the MFP data store 106. In an alternative embodiment, the GUI specification receiver 212 receives the GUI specification directly from an MFP of the selected type of MFP.

The executable generator 214, in one embodiment, generates the executable to execute the business process on the particular type of MFP. The executable generator 214 uses the GUI specification and the executable language definition to determine the type of executable to be generated. The executable generator 214 uses the generic business process and associated entity specifications to determine the input and output requirements of the executable.

The executable transmitter 216, in one embodiment, transmits the executable to an MFP of the selected type of MFP for execution of the business process. The executable transmitter 216 may be any type of transmitter capable of transmitting an executable to the MFP. For example, the executable transmitter 216 may include an ethernet connection. In some embodiments, the executable transmitter 216 writes the executable to a portable memory card (not shown) for use in the MFP.

The data bus 218, in one embodiment, communicates data between elements of the universal MFP server 102. Elements of the universal MFP server 102 are in electronic communication with the data bus 218, and through the data bus 218, with other elements of the universal MFP server 102. For example, the entity specification receiver 202 may communicate an entity specification over the data bus 218 to the entity specification integrator 206. The data bus 218 may be any type of data communication system used in servers, including, but not limited to, a parallel bus, a serial bus, a network, a universal serial bus (USB), and a switched fabric communications link. The data bus 218 may include hardware components, software components, or a combination of hardware and software components.

Figure 3:
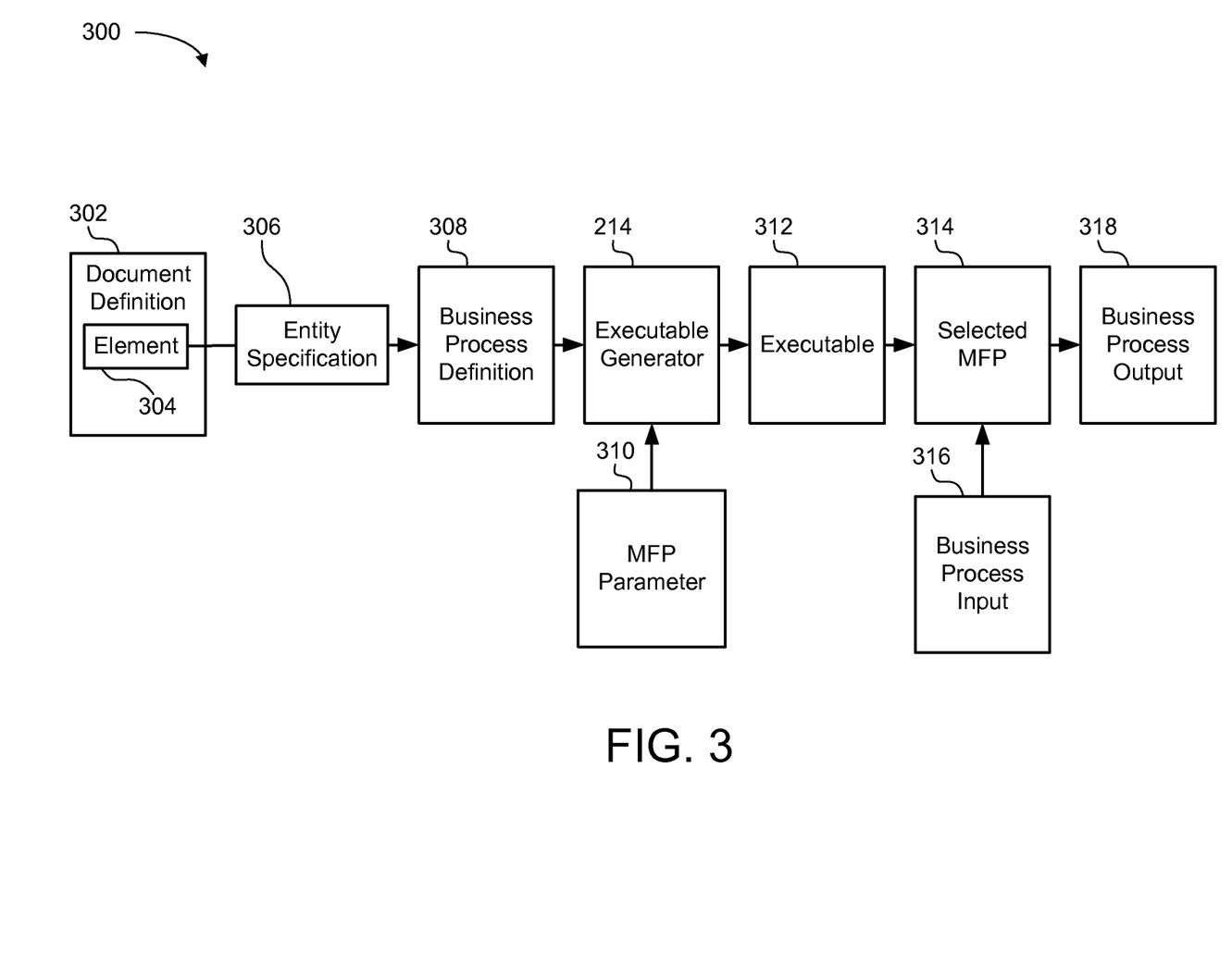
FIG. 3 depicts a schematic diagram of another embodiment of a system for generating an executable for an MFP of a heterogeneous mix of MFPs.

FIG. 3 depicts a schematic diagram of another embodiment of a system 300 for generating an executable 312 for a selected MFP 314 of a heterogeneous mix of MFPs 112. The system 300 includes a document definition 302, an entity specification 306, a business process definition 308, an executable generator 214, an MFP parameter 310, an executable 312, a selected MFP 314, a business process input 316, and a business process output 318. The system 300 generates an executable 312 from a generic business process definition 308 for execution on a selected MFP 314.

The document definition 302, in one embodiment, defines a document used in a business process. The document definition 302 includes one or more elements 304. Each element 304 is a particular piece of data contained within the document described in the document definition 302. For example, the document definition 302 may describe a faxed purchase order, and a company name on the faxed purchase order may be an element 304.

In one embodiment, the entity specification 306 describes the element 304. For example, the entity specification 306 may describe where in the document to find the element 304. The entity specification 306 is described in greater detail in relation to FIG. 4.

The business process definition 308, in one embodiment, describes a business process. The business process definition 308 uses one or more entity specifications 306 to access one or more elements 304 in a document described by a document definition 302. The business process definition 308 is a generic business process definition which is not tied to any particular type of MFP.

In one embodiment, the MFP parameter 310 describes an aspect of the selected MFP 314 from among the plurality of MFPs 112. For example, the MFP parameter 310 may describe an executable language definition of the selected MFP 314. The MFP parameter 310 is described in greater detail in relation to FIG. 5.

The executable generator 214, in one embodiment, generates an executable 312 to implement the business process on the selected MFP 314 based on inputs of the business process definition 308 and one or more MFP parameters 310. In some embodiments, the executable 312 is deployed to the selected MFP 314 and executed to perform the business process described by the business process definition 308. Execution of the executable 312 on the selected MFP 314 allows for receipt of the business process input 316 and generation of the business process output 318.

For example, the business process may include scanning a document to a particular storage location in response to an input at the selected MFP 314 by a user. In this example, the business process input 316 may include receipt of an input at a user interface of the selected MFP 314 selecting the storage location, and the business process output 318 may include transmission of the scanned document to the selected storage location.

Figure 4:
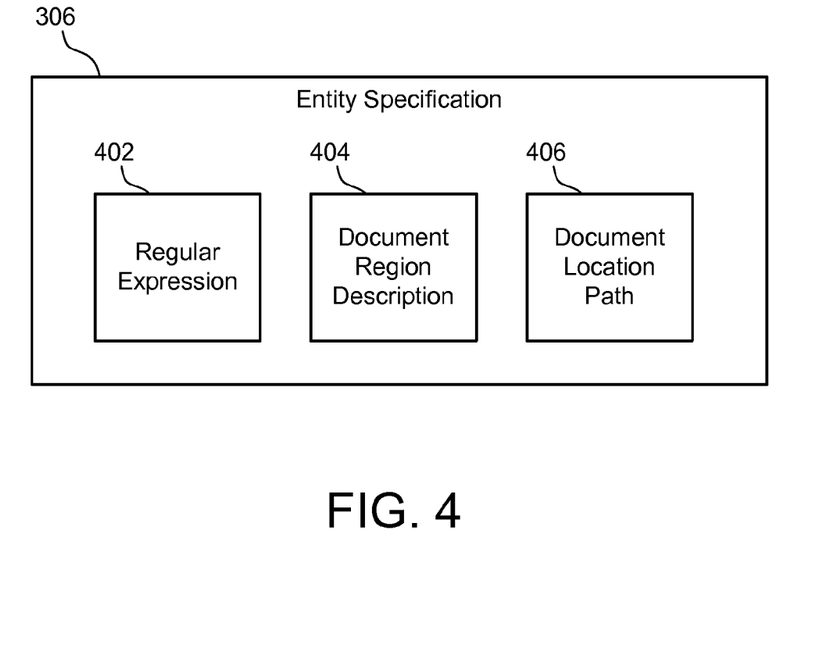
FIG. 4 depicts a schematic diagram of one embodiment of the entity specification of FIG. 3.

FIG. 4 depicts a schematic diagram of one embodiment of the entity specification 306 of FIG. 3. The entity specification 306 includes a regular expression 402, a document region description 404, and a document location path 406. The entity specification 306 describes an element 304 of a document used in a business process.

In some embodiments, the entity specification 306 includes a regular expression 402. The regular expression 402 identifies a string of text in the document. For example, the regular expression 402 may identify the phrase "Order Date" in a scanned document, and the entity specification 306 may indicate that the date following the phrase "Order Date" is the date an order was placed.

The entity specification 306, in some embodiments, includes a document region description 404. The document region description 404 identifies a particular area of the document. For example, the document region description 404 may indicate the upper right-hand quadrant of a document, and the entity specification 306 may limit the search for a particular element upper right-hand quadrant of the document.

In certain embodiments, the entity specification 306 includes a document location path 406. The document location path 406 indicates a particular location of an element 304 within a document. For example, a document may be a structured document, such as an XML document, and the document location path 406 describes how to navigate the structured document to the entity 304, such as to a particular tag within an XML document.

In some embodiments, the entity specification 306 includes a combination of descriptors. For example, the entity specification 306 may describe a purchase date using a document region description 404 of the top right-hand quadrant of the document and a regular expression 402 indicating that the purchase date is to the right of the regular expression "[Dd]ate".

Figure 5:
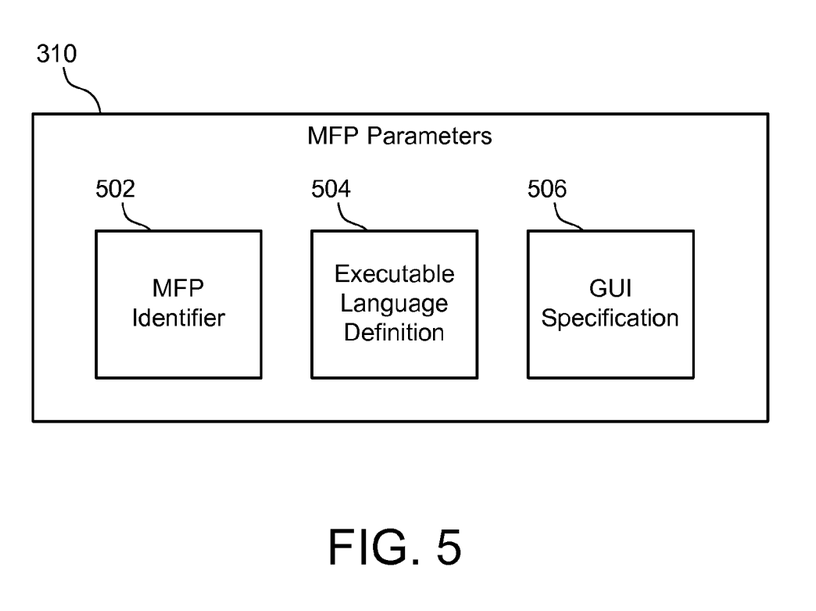
FIG. 5 depicts a schematic diagram of one embodiment of the MFP parameters of FIG. 3.

FIG. 5 depicts a schematic diagram of one embodiment of the MFP parameters 310 of FIG. 3. The MFP parameters 310 include an MFP identifier 502, an executable language definition 504, and a GUI specification 506. The MFP parameters 310 describe characteristics of a selected MFP 314.

The MFP identifier 502, in one embodiment, identifies the selected MFP 314. Any type of identifier that identifies a particular type of MFP may be used as an MFP identifier 502. For example, the MFP identifier 502 may be a brand and model number of the selected MFP 314. In another example, the MFP identifier 502 may identify a class of MFPs having similar characteristics. In yet another example, the MFP identifier 502 may identify an individual MFP.

In one embodiment, the executable language definition 504 describes an executable language operable on the selected MFP 314. The executable language definition 504 includes one or more rules for converting steps in a generic business process into executable steps operable on the selected MFP 314. The executable language definition 504 may be accessed using the MFP identifier 502. The executable generator 214 generates the executable 312 using the executable language definition 504.

The GUI specification 506, in one embodiment, describes characteristics of the user interface on the selected MFP 314. For example, the GUI specification 506 may indicate a resolution on an LCD screen of the selected MFP 314. The GUI specification 506 may also indicate the position and location of buttons on the MFP. The executable generator 214 generates the executable 312 using the GUI specification 506.

Figure 6:
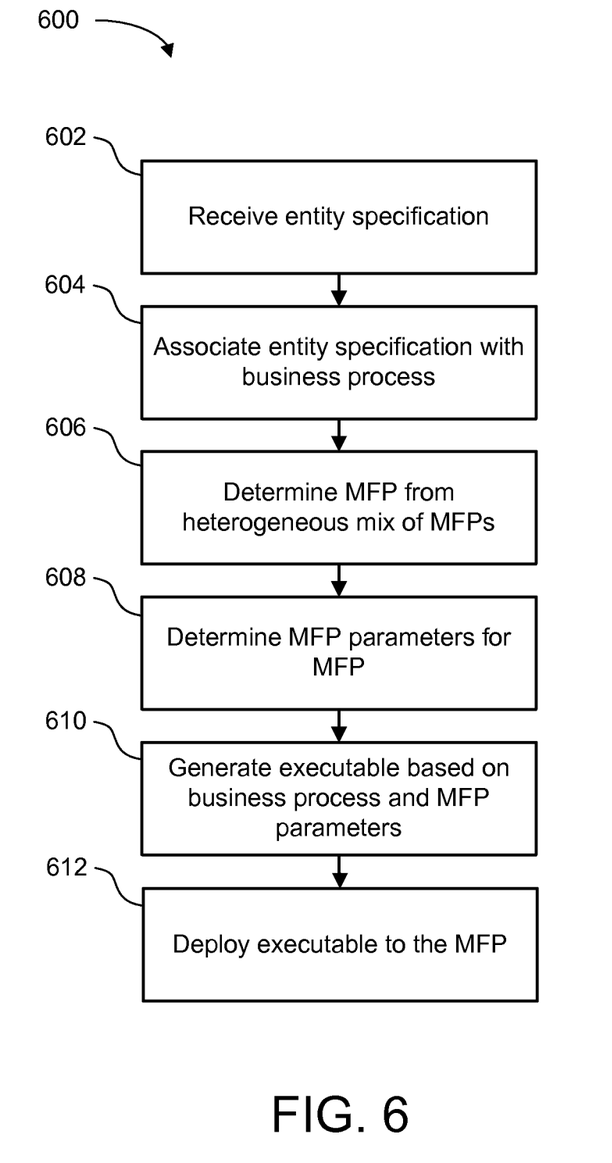
FIG. 6 is a flowchart diagram depicting one embodiment of a method for generating an executable for an MFP of a heterogeneous mix of MFPs.

FIG. 6 is a flowchart diagram depicting one embodiment of a method 600 for generating an executable 312 for a selected MFP 314 of a heterogeneous mix of MFPs 112. The entity specification receiver 202 receives 602 the entity specification 306. In some embodiments, the entity specification 306 is received 602 from the universal MFP client 110. The entity specification 306 describes an element 304 of a document associated with a business process.

The entity specification 306 is associated 604 with a generic business process definition 308 by the entity specification integrator 206. In certain embodiments, the entity specification 306 is associated 604 with the generic business process definition 308 based on an input from a user.

The MFP selector 208 determines 606 a selected MFP 314 from a heterogeneous mix of MFPs 112. In some embodiments, the MFP selector 208 determines 606 a selected type of MFP having one or more common MFP parameters 310 from the heterogeneous mix of MFPs 112. Determination 606 of the selected MFP 314 is based on input from a user. In an alternative embodiment, determination 606 of the selected MFP 314 is carried out automatically based on one or more parameters such as location or capabilities of the selected MFP 314.

The universal MFP server 102 determines 608 one or more MFP parameters 310 for the selected MFP 314. The executable language definition receiver 210 receives an executable language definition for the selected MFP 314 and the GUI specification receiver 212 receives a GUI specification for the selected MFP 314 as MFP parameters 310.

The executable generator 214 generates 610 an executable 312 capable of performing the business process described by the generic business process definition 308 that conforms to the MFP parameter(s) 310. The executable 312 may be generated 610 based upon the executable language definition received by the executable language definition receiver 210. In some embodiments, the executable generator 214 generates 610 a second executable for execution on a second selected MFP. In one embodiment, the executable generator 214 generates 610 an executable for each type of MFP in the plurality of MFPs 112 capable of executing the business process.

The executable transmitter 216 deploys 612 the executable 312 to the selected MFP 314. In one embodiment, the executable 312 is deployed 612 by transmitting the executable 312 to the selected MFP 314 for execution.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, including operations to incorporate an entity specification into a business process in response to an input by a user, determine an MFP from a heterogeneous mix of MFPs for implementation of the business process, and generate an executable to execute on the MFP. The entity specification describes an element of a document and is associated with the business process. The MFP has an associated executable language and a GUI specification. The executable conforms to the executable language and the GUI specification, is generated from the entity specification and the business process, and performs the business process when executed by the MFP.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable storage medium providing program code for use by or in connection with a computer or any instruction execution system. For the purposes of this description, a computer-usable or computer readable storage medium can be any apparatus that can store the program for use by or in connection with the instruction execution system, apparatus, or device.

The computer-useable or computer-readable storage medium can be an electronic, magnetic, optical, electromagnetic, infrared, or semiconductor system (or apparatus or device), or a propagation medium. Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

An embodiment of a data processing system suitable for storing and/or executing program code includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method comprising:
   incorporating an entity specification into a business process in response to an input by a user, wherein the entity specification describes an element of a document and is associated with the business process;
   determining a multifunction printer (MFP) from a heterogeneous mix of MFPs for implementation of the business process, wherein the MFP has an associated executable language and a graphical user interface (GUI) specification;
   associating the entity specification with an element of the GUI specification;
   generating, from the entity specification and the business process, an executable that conforms to the executable language and the GUI specification and performs the business process when executed by the MFP; and
   deploying the executable to the MFP.

2. The computer-implemented method of claim 1, further comprising generating, from the entity specification and the business process, a second executable that conforms to a second executable language and a second GUI specification associated with a second MFP.

3. The computer-implemented method of claim 1, wherein the entity specification comprises a rule set comprising a regular expression.

4. The computer-implemented method of claim 1, wherein the entity specification comprises a rule set describing a region of the document.

5. The computer-implemented method of claim 1, wherein the entity specification comprises a rule set describing a location path of the document.

6. The computer-implemented method of claim 1, further comprising retrieving an executable language definition from the MFP.

7. The computer-implemented method of claim 1, further comprising determining the executable language in response to retrieving an identifier for the MFP.

* * * * *